UNITED STATES PATENT OFFICE.

BERNHARD HESS, OF BAIREUTH, BAVARIA, GERMANY.

MANUFACTURE OF ARTIFICIAL STONE AND ARTIFICIAL EMERY.

SPECIFICATION forming part of Letters Patent No. 283,603, dated August 21, 1883.

Application filed March 23, 1883. (No specimens.)

*To all whom it may concern:*

Be it known that I, BERNHARD HESS, a subject of the King of Bavaria, and a resident of the city of Baireuth, in the Kingdom of Bavaria, Germany, have invented a certain new and useful Improved Method for the Manufacture of Artificial Stone and Artificial Emery, of which the following is a specification.

The object of my invention is to produce valuable compositions for the manufacture of fire-bricks, paving-stones, table-tops, tiles, crucibles, crushing-rollers, &c., from minerals which abound on the face of the earth, and thereby enable the manufacture of such articles at all places at less cost, and produce a superior article. To obtain this object I pulverize serpentine, (or minerals of similar composition,) steatite, feldspar, mica, quartz, and fire-clay. By adding a limited quantity of water to the mixture of these minerals a dough is produced which, when formed and heated to white heat, will become exceedingly hard and well adapted for the manufacture of the objects mentioned above.

I will now proceed to describe the processes more in detail.

Generally I mix forty parts of serpentine or steatite, ten parts of feldspar, and two parts of mica thoroughly, each having been ground before, and add sufficient water to form a dough which will retain its shape when molded. This dough is then molded or stamped into suitable forms. The molds having been removed, the bricks or vessels will first be dried by exposing them to a gradually-increasing heat, and finally heated to white heat.

For table-tops, tiles, and wall-coverings six parts of fire-clay are added to the above-mentioned composition.

For grinding-stones a mixture of forty parts of finely-ground serpentine, (having been heated beforehand,) ten parts of feldspar, and five parts of quartz, is used.

For crucibles forty parts of steatite, ten parts of feldspar, and six parts of fire-clay are finely ground and well mixed. When dry the mixture is moistened with water to enable it to be treated on a revolving disk, like porcelain. The molded crucible will be dried slowly and then heated to white heat. Such crucibles will endure extreme temperature, and will not be affected by acids, neither will they change the color of substances, like gum used in the manufacture of varnishes, when treated therein. The same composition of minerals will be used for crushing-rollers. They only require to be turned off after having been dried thoroughly.

For the manufacture of artificial emery, serpentine or similar minerals will be ground superficially and then heated in a furnace to an intense white heat. After having been cooled the crushed minerals will be graded by passing them through sieves of different caliber. The product received will surpass the best emery as to hardness, acuteness, and durability, and is well adapted for grinding and polishing metals.

Having described my invention, what I claim, and desire to secure by Letters Patent, is—

In the manufacture of artificial stone, a composition consisting of serpentine, steatite, feldspar, mica, quartz, and fire-clay, substantially as described.

In testimony that I claim the foregoing as my own I affix my signature, this 17th day of February, 1883, in presence of two witnesses.

BERNHARD HESS.

Witnesses:
 A. MUSSINAU,
 G. HENRY HORSTMANN.